United States Patent
Fryberger, Jr. et al.

(10) Patent No.: US 6,878,873 B2
(45) Date of Patent: Apr. 12, 2005

(54) DAMPING SLEEVE WITH RESILIENT SUPPORT MEMBERS

(75) Inventors: Samuel B. Fryberger, Jr., Spring City, PA (US); Brian M. Snyder, Downingtown, PA (US)

(73) Assignee: Federal-Mogul World Wide, Inc., Southfield, MI (US)

(*) Notice: Subject to any disclaimer, the term of this patent is extended or adjusted under 35 U.S.C. 154(b) by 149 days.

(21) Appl. No.: 10/214,507

(22) Filed: Aug. 8, 2002

(65) Prior Publication Data

US 2003/0075846 A1 Apr. 24, 2003

Related U.S. Application Data

(60) Provisional application No. 60/311,291, filed on Aug. 9, 2001.

(51) Int. Cl.[7] .................................................. H02G 3/10
(52) U.S. Cl. ..................... 174/48; 174/68.3; 174/47; 174/78; 174/73 R; 138/109; 138/103; 138/122; 138/138; 138/133; 138/129; 156/196; 156/148; 428/304.4; 428/308.4; 428/317.9; 248/567; 248/636; 267/136
(58) Field of Search ........................... 174/48, 68.3, 47, 174/78, 73 R; 138/109, 103, 122, 138, 133, 129; 156/148, 196; 428/304.4, 308.4, 317.9; 248/567, 636; 267/136

(56) References Cited

U.S. PATENT DOCUMENTS

| 1,400,078 | A | 12/1921 | Kempton |
| 2,039,781 | A | 5/1936 | Debenedetti ................ 138/70 |
| 2,494,285 | A | 1/1950 | Clapp ......................... 174/42 |
| RE24,613 | E | 3/1959 | Hageltorn .................... 154/43 |
| 3,288,918 | A | 11/1966 | Schlein ....................... 174/173 |
| 4,098,298 | A | 7/1978 | Vohrer ........................ 138/122 |
| 4,205,888 | A | * 6/1980 | Wade .......................... 439/98 |

(Continued)

FOREIGN PATENT DOCUMENTS

GB 566679 1/1945 ................ 428/39.1

OTHER PUBLICATIONS

U.S. appln. No. 10/214,621, filed Aug. 8, 2002, entitled Vibration Damping Corrugated Flexible Sleeving (Marks).
U.S. appln. No. 10/213,026, filed Aug. 6, 2002, entitled Damped Flexible Protective Sleeving (Fatato).
U.S. patent appln. Publication No. US2002/0006523, published Jan. 17, 2002, entitled Structural Members Containing Vibration Damping Mechanisms and Methods for Making the Same (Obeshaw), filed Mar. 16, 2001.
International Search Report dated Jun. 19, 2003 (5 pages).

Primary Examiner—Dean A. Reichard
Assistant Examiner—Anton Harris
(74) Attorney, Agent, or Firm—Synnestvedt & Lechner LLP

(57) ABSTRACT

A damped sleeve having a damping layer attached to a backing layer is disclosed. The damping layer is formed from a non-woven energy absorbing felt and is attached to the backing layer by lines of attachment which define pockets between the layers. The layers are positioned coaxially around an axis and define a central space for receiving elongated items to be protected from vibration. Resilient filamentary support members are arranged between the damping and backing layers to support the layers radially in spaced relation relative to the axis. The support members may be helically wrapped around the axis, circumferentially positioned or arranged in a zig-zag pattern transversely to the axis. A slit in the layers provides access to the central space.

23 Claims, 5 Drawing Sheets

U.S. PATENT DOCUMENTS

| | | | |
|---|---|---|---|
| 4,283,239 A | 8/1981 | Corke et al. ................... | 156/85 |
| 4,513,787 A | 4/1985 | Hegler et al. ............... | 138/166 |
| 4,780,574 A | 10/1988 | Neuroth ................... | 174/102 D |
| 4,797,512 A | 1/1989 | Kumagai et al. ............ | 174/135 |
| 4,827,081 A | 5/1989 | Seabourne et al. ......... | 174/139 |
| 4,854,416 A | 8/1989 | Lalikos et al. .............. | 181/207 |
| 4,929,478 A | 5/1990 | Conaghan et al. ......... | 428/35.1 |
| 4,939,819 A | 7/1990 | Moyer ........................ | 24/16 R |
| 4,970,351 A | 11/1990 | Kirlin ........................ | 174/68.3 |
| 5,077,449 A | 12/1991 | Cornibert et al. ........... | 174/107 |
| 5,094,318 A | 3/1992 | Maeda et al. ............... | 181/290 |
| 5,129,429 A | 7/1992 | Winter et al. ............... | 138/121 |
| 5,143,122 A * | 9/1992 | Adkins ....................... | 138/109 |
| 5,164,029 A | 11/1992 | Oohashi et al. ............. | 152/546 |
| 5,469,892 A | 11/1995 | Noone et al. ............... | 138/121 |
| 5,485,870 A | 1/1996 | Kraik ......................... | 138/122 |
| 5,556,495 A | 9/1996 | Ford et al. ................... | 156/148 |
| 5,671,649 A | 9/1997 | Piotrowski et al. .............. | 87/9 |
| 5,792,532 A | 8/1998 | Pfleger ....................... | 428/36.9 |
| 5,843,542 A | 12/1998 | Brushafer et al. .......... | 428/36.1 |
| 5,849,379 A | 12/1998 | Gladfelter et al. .......... | 428/35.8 |
| 5,858,521 A | 1/1999 | Okuda et al. ................ | 428/219 |
| 5,965,249 A * | 10/1999 | Sutton et al. ............. | 428/304.4 |
| 6,004,492 A | 12/1999 | Lewit et al. ................ | 264/46.4 |
| 6,132,882 A | 10/2000 | Landin et al. .............. | 428/437 |
| 6,186,182 B1 | 2/2001 | Yoon .......................... | 138/122 |
| 6,309,721 B1 | 10/2001 | Gladfelter et al. ......... | 428/36.1 |
| 6,310,284 B1 | 10/2001 | Ikeda ....................... | 174/35 R |
| 6,321,794 B1 | 11/2001 | Ishida et al. ................ | 138/121 |
| 6,332,602 B1 | 12/2001 | Oishi ......................... | 267/122 |
| 6,461,078 B1 | 10/2002 | Presby ....................... | 405/49 |
| 6,491,067 B1 | 12/2002 | Davenport et al. ......... | 138/110 |

\* cited by examiner

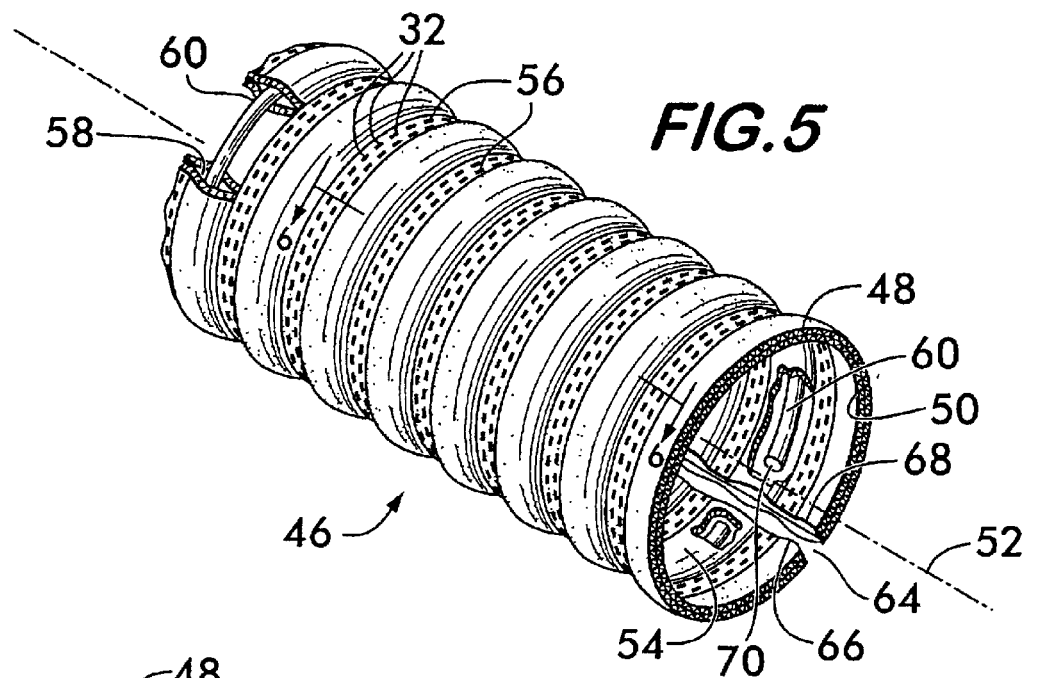
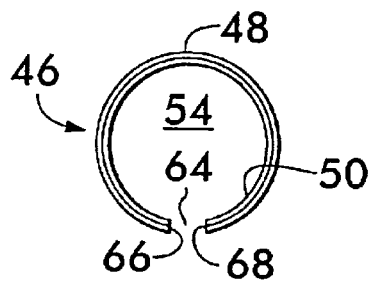 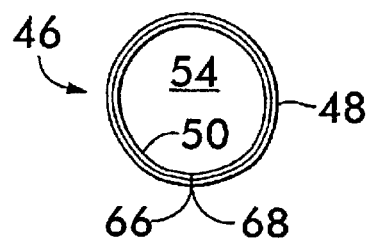 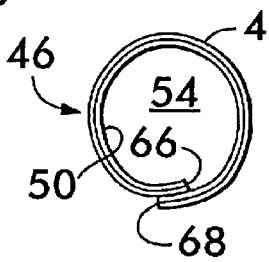
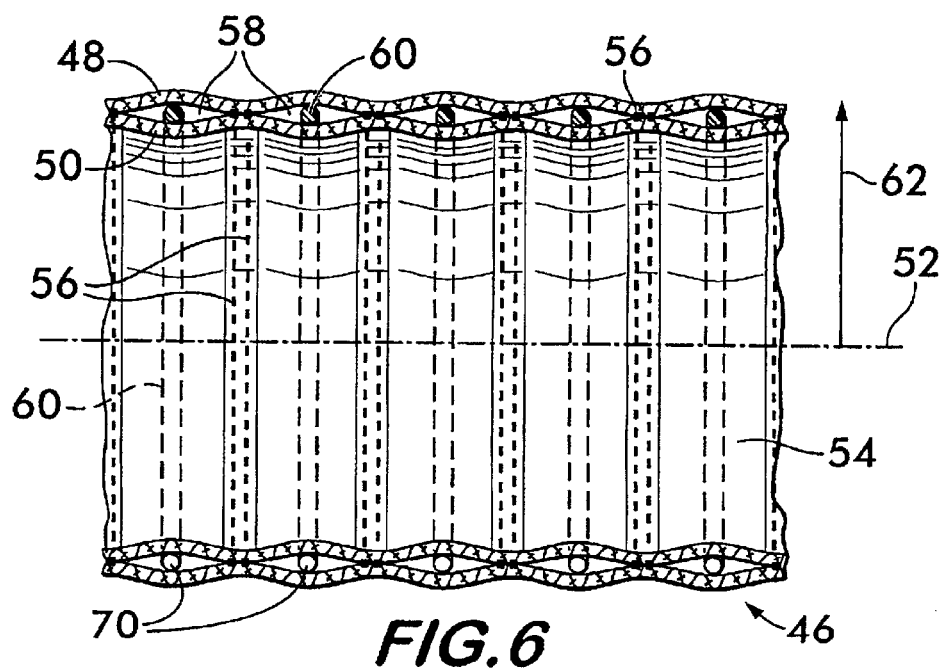

DAMPING SLEEVE WITH RESILIENT SUPPORT MEMBERS

RELATED APPLICATION

This application is based on and claims the benefit of U.S. Provisional Application No. 60/311,291, filed Aug. 9, 2001.

FIELD OF THE INVENTION

This invention concerns sleeving for encasing and protecting elongated substrates, such as wiring harnesses, and for reducing rattle noise from such substrates when they are used in a high-vibration environment.

BACKGROUND OF THE INVENTION

Elongated substrates, such as wiring harnesses, fluid conduits, such as brake lines and fuel lines, and optical fiber bundles are often used in automotive, aerospace and marine environments where they are subjected to significant ambient vibration. In automotive applications, wiring harnesses in particular are pernicious sources of unwanted "rattle noise" due to their propensity to resonate in response to structure borne vibration caused by engine operation or irregularities of the road surface over which the vehicle is passing. Wiring harnesses typically extend substantially throughout the vehicle's passenger compartment where they distribute power and control signals from the engine compartment to the dashboard instruments, interior lights, radio, speakers, electric windows, electric door locks, the window defogging element and on to the trunk to power the tail lights and often an electric fuel pump which may be positioned in the fuel tank. Although the harness is intermittently attached to the vehicle structure, the lengths of the harness between attachment points will often resonate and rattle against the structure in response to relatively low-frequency vibrations within the range of human hearing and provide a source of noise, which is both annoying and a cause of concern to the vehicle occupants. Aside from the noise annoyance, vibration of wiring harnesses will cause fatigue failures of the wiring, solder joints or mechanical connectors, leading to electrical malfunctions, such as short circuits, which could result in a vehicle fire. The failure due to vibration and fatigue of other elongate substrates, such as fuel lines or brake lines, also has catastrophic potential. There is clearly a need for a device which will help damp vibration of elongated substrates and thereby reduce sympathetic vibration of the substrates and its resultant rattle noise and associated fatigue failures.

SUMMARY AND OBJECTS OF THE INVENTION

The invention concerns a damped sleeve for receiving and protecting elongated substrates. The sleeve comprises a flexible damping layer positioned coaxially around an axis and radially spaced outwardly therefrom. The damping layer defines a central space for receiving the elongated substrates and is formed from an energy absorbing material, preferably a non-woven felt. A flexible backing layer is positioned in facing relationship with the damping layer. The backing layer and the damping layer are attached to one another along a plurality of lines of attachment positioned in spaced relation to one another. The lines of attachment have a predetermined orientation relative to the axis and may be oriented either, transversely or parallel thereto. The lines of attachment define a plurality of elongated pockets between the damping and backing layers, the pockets being positioned adjacent to one another. Resilient, flexible, elongated filamentary support members are positioned between the damping and the backing layers and are fixed in position by the lines of attachment. The filamentary support members may be positioned within the pockets and are resiliently curved so as to support the damping and backing layers in the spaced relation to the axis, thereby maintaining patency of the central space.

In one embodiment of the sleeve, the damping layer and the backing layer comprise an elongated strip helically wound around the axis at a predetermined pitch. The lines of attachment are oriented lengthwise along the strip and define the pockets which substantially conform to a helical shape around the axis. A plurality of the filamentary support members are captured within the pockets, preferably one per pocket. The support members are resiliently set into a helical shape substantially conforming to the predetermined pitch, supporting the damping and backing layers in spaced relation to the axis.

In another embodiment of the damped sleeve, the lines of attachment are oriented circumferentially around the central space in spaced relation lengthwise along the axis. The lines define the pockets which substantially conform to a circumferential shape around the axis. One of the filamentary support members is positioned within each of the pockets, and each of the filamentary support members is resiliently curved into a ring shape for radially supporting the damping and backing layers in spaced relation to the axis.

In yet another embodiment of the damped sleeve, the damping and backing layers comprise an elongated strip having oppositely positioned edges. The lines of attachment are oriented substantially lengthwise along the strip and define pockets which conform to an elongated shape substantially parallel to the axis. The filamentary support members are positioned in a plurality of segments arranged in spaced relation along the strip transversely to the lines of attachment and the pockets. Each of the segments is connected to a neighboring segment by a reverse bend of the filamentary support member, and the segments are resiliently curved about the axis so as to bring the edges of the elongated strip adjacent to one another, thereby forming a tube defining the central space.

It is an object of the invention to provide a sleeve for protecting elongate substrates from vibration.

It is another object of the invention to provide a protective sleeve using a non-woven felt as a damping material.

It is yet another object of the invention to provide a protective sleeve which is flexible and resilient and able to conform to a curved shape or path to follow the path of a substrate.

These and other objects and advantages of the invention will become apparent upon consideration of the following drawings and detailed description of preferred embodiments.

BRIEF DESCRIPTION OF THE DRAWINGS

FIG. 5 is a partial cut-away perspective view of another embodiment of a damped sleeve according to the invention;

FIG. 6 is a sectional view taken along lines 6—6 of FIG. 5;

FIGS. 7A through 7C are cross-sectional views of the sleeve shown in FIG. 5;

DETAILED DESCRIPTION OF THE PREFERRED EMBODIMENTS

Figure 1:
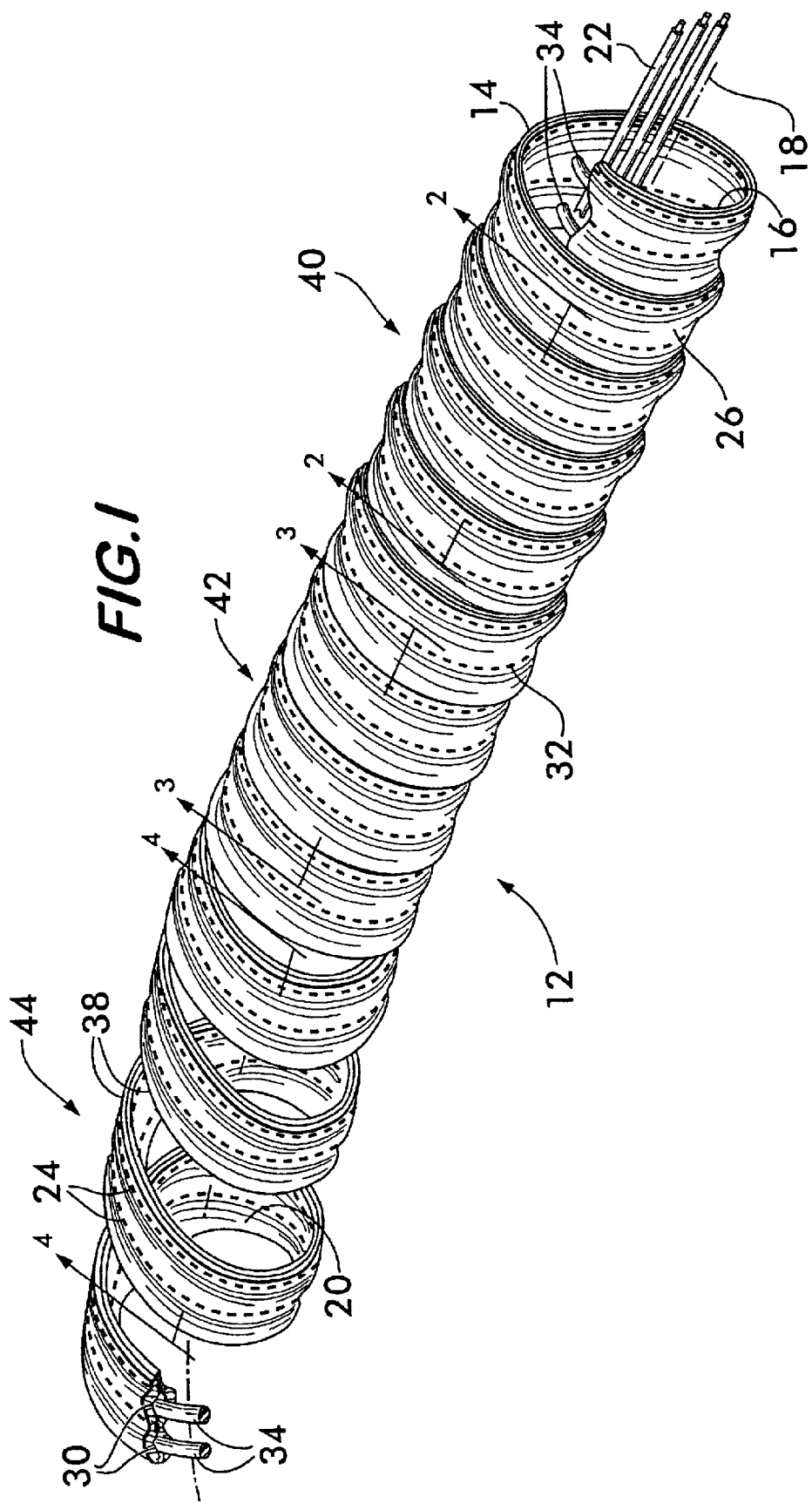
FIG. 1 is a perspective view of an embodiment of a damped sleeve according to the invention.

FIG. 1 shows a damped sleeve 12 formed from a flexible damping layer 14 and a flexible backing layer 16. Preferably, the damping layer forms the outwardly facing surface of sleeve 12 and comprises an energy absorbing material, such as a non-woven felt. Synthetic polymers such as polyester, polypropylene and nylon felts are preferred for their robustness, low cost and ready availability, but felts made from organic fibers are also feasible. Felts are preferred because the random fiber structure provides for effective absorption of vibrational energy, thereby providing effective damping of acoustic noise and structure borne vibration.

The damping layer 14 and the backing layer 16 are positioned coaxially around an axis 18, the layers being spaced radially outwardly from the axis and defining a central space 20 adapted to receive elongated substrates 22, which may be, for example, a wiring harness. The damping layer 14 and the backing layer 16 are joined together by a plurality of lines of attachment 24. Lines of attachment 24 are positioned in spaced relation to one another and have a predetermined orientation relative to the axis 18. In the sleeve embodiment 12 shown in FIG. 1, the layers 14 and 16 comprise an elongated strip 26 helically wrapped around axis 18. The lines of attachment 24 are oriented lengthwise along the strip 26, thereby assuming a helical orientation substantially matching that of the strip. Being in spaced relation to one another, the lines of attachment 24 define a plurality of pockets 30 between the damping and backing layers 14 and 16. It is preferred to form lines of attachment 24 by welding the damping layer 14 to the backing layer 16. The two layers must be compatible, i.e., must be fusible to one another for this form of attachment to be effective. For simplicity of manufacture and to ensure compatibility of the layers, they may both be made of the same material, for example, polyester felt. Welding of such layers may be effected by ultrasonic welding techniques which produce a plurality of discrete welds 32 intermittently spaced along the lines of attachment 18. Such techniques provide the advantage of permitting the sleeve to be formed in a continuous process, allowing sleeves of any length to be manufactured.

Resilient, flexible, elongated filamentary supports 34 are positioned, preferably one support per pocket 30, captured between the damping and backing layers 14 and 16 and fixed in position by the line of attachment 24. Support members 34 are preferably formed from a polymeric monofilament such as polyester, polypropylene, nylon or ABS plastics and are resiliently curved so as to support the damping and backing layers in spaced relation to the axis 18 and thereby maintain the patency of the central space 20. Thermoplastic is a preferred material for the support members 34 because thermoplastic may be resiliently set into a shape, such as a helix as shown in FIG. 1, and yet maintain the required flexibility allowing the sleeve 12 to conform to the shape of the elongated substrate which the sleeve surrounds.

Figure 2:
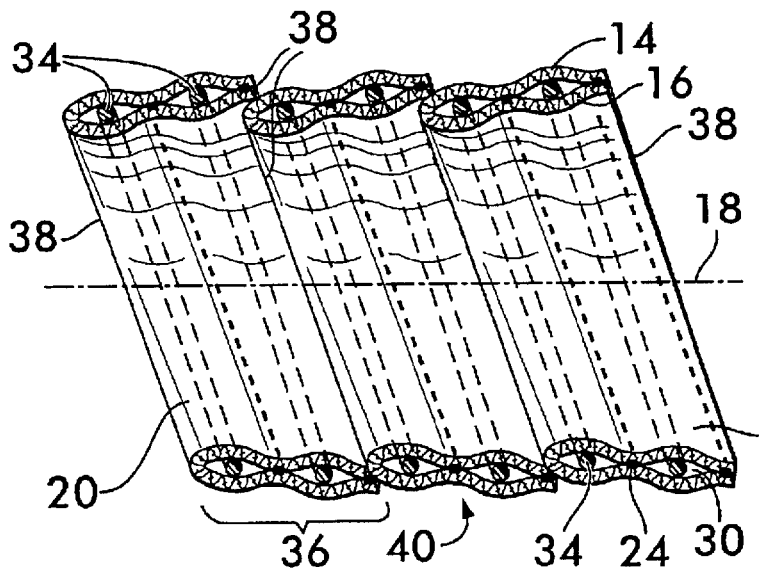
FIG. 2 is a sectional view taken along lines 2—2 of FIG. 1.
Figure 3:
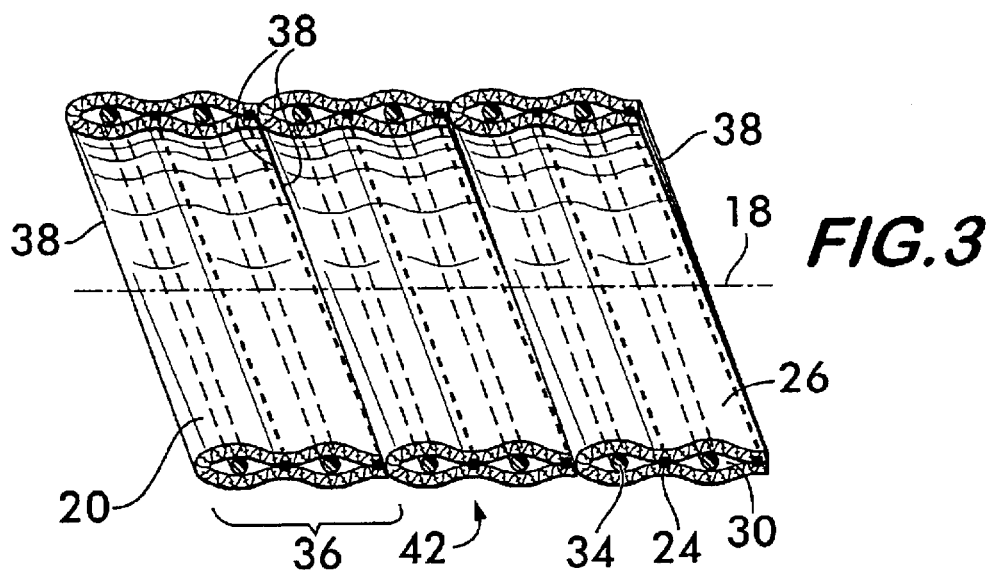
FIG. 3 is a sectional view taken along lines 3—3 of FIG. 1.
Figure 4:
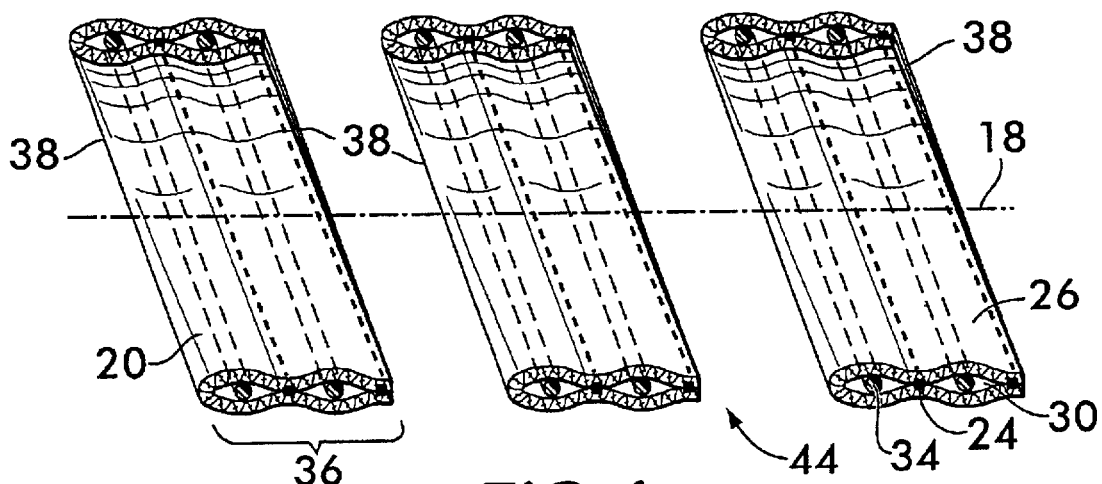
FIG. 4 is a sectional view taken along lines 4—4 of FIG. 1.

The helical pitch of the damping and backing layers is substantially matched by the support members 34 to hold the sleeve 12 in any of several different configurations illustrated in FIGS. 2 through 4. For the configuration shown in FIG. 2, the helical pitches of strip 26 and the support members 34 are determined relatively to the width 36 of the strip such that the strip's edges 38 are resiliently held in substantially overlapping relation, thereby forming a substantially continuous tube 40 around the central space 20. Due to the flexible, resilient nature of the support members 34 the edges 3B of the strip are resiliently separable from one another to provide access to the central space 20.

As shown in FIG. 3, the helical pitches of the strip 26 and support members 34 are determined with respect to the width 36 so as to position the edges 38 in abutting relationship, also forming a substantially continuous tube 42.

In the configuration shown in FIG. 4, the pitches of the strip 26 and the support members 34 are determined relatively to the strip width 36 so as to position the edges 38 in spaced relation, thereby forming a substantially open or discontinuous tube 44. The configurations of tubes 40, 42 and 44 may be seen in perspective view in FIG. 1.

FIG. 5 shows another embodiment of the damped sleeve 46 according to the invention. Sleeve 46 is formed of a flexible damping layer 48 attached in facing relationship to a flexible backing layer 50. Both the damping and backing layers are positioned coaxially around and radially spaced outwardly from an axis 52 so as to define a central space 54 adapted to receive elongated substrates. Similar to the previous embodiment described above, the layers comprise a non-woven felt, preferably a polymeric material such as polyester, polypropylene or nylon.

Damping layer 48 is attached to backing layer 50 by a plurality of lines of attachment 56. The lines of attachment are preferably formed by fusing the layers together by ultrasonic welds 32, but other attachment techniques, such as sewing or by fasteners, are also feasible. In the embodiment shown in FIG. 5, lines of attachment 56 are oriented circumferentially around the central space 54 in spaced relation to one another lengthwise along the axis 52. As best shown in FIG. 6, the lines of attachment together with the damping and backing layers 48 and 50 define a plurality of circumferential pockets 58 arranged in spaced relation lengthwise along the sleeve 46. A plurality of filamentary support members 60 are positioned within pockets 58, preferably one support member per pocket. Filamentary support members 60 are preferably formed from a polymeric monofilament such as polyester, polypropylene, nylon or ABS plastics and are resiliently curved so as to support the damping and backing layers 48 and 50 in spaced relation to the axis 52 and thereby maintain the patency of the central space 54. Thermoplastic is a preferred material for the support members 32 because thermoplastic may be resiliently set into a shape, such as the ring shape shown in FIG. 5 to provide the necessary radial support to the damping and backing layers.

Support members 60 may be resiliently set into any practical shape and a circular shape with all of the support members 60 having the same radius 62 as shown is preferred for simplicity and to provide a sleeve with a constant cross-section and substantially symmetrical bending characteristics.

To provide access to the central space-54, a slit 64 (see FIG. 5) is formed in the damping and backing layers 48 and 50. Slit 64 extends lengthwise along sleeve 46 and is defined by edges 66 and 68 positioned adjacent to one another and oriented substantially parallel to axis 52. Support members 60 each have a gap 70 aligned with the slit 64 so as to allow unimpeded access to the central space 54.

Since the support members 60 may be resiliently set into a variety of shapes, they may be used to bias the configuration of slit 64 into an opened or closed position. As shown in FIGS. 7A–7C, the support members may be resiliently set to bias the edges 66 and 68 apart from one another to have the slit normally open (FIG. 7A), or the support member may be resiliently set to bias the edges 66 and 68 into abutting relationship (FIG. 7B), effectively closing slit 64, or the resilient set of the support members may be used to bias the edges 66 and 68 in substantially overlapping relationship (FIG. 7C). Regardless of the biased condition of the support members 60, the slit may be easily manually opened or enlarged due to the flexibility of the support members and the damping and backing layers. Once any force is removed from the sleeve 46, however, the resilient properties of the support members will bias the sleeve back into the desired position in which it has been resiliently set.

Figure 8:
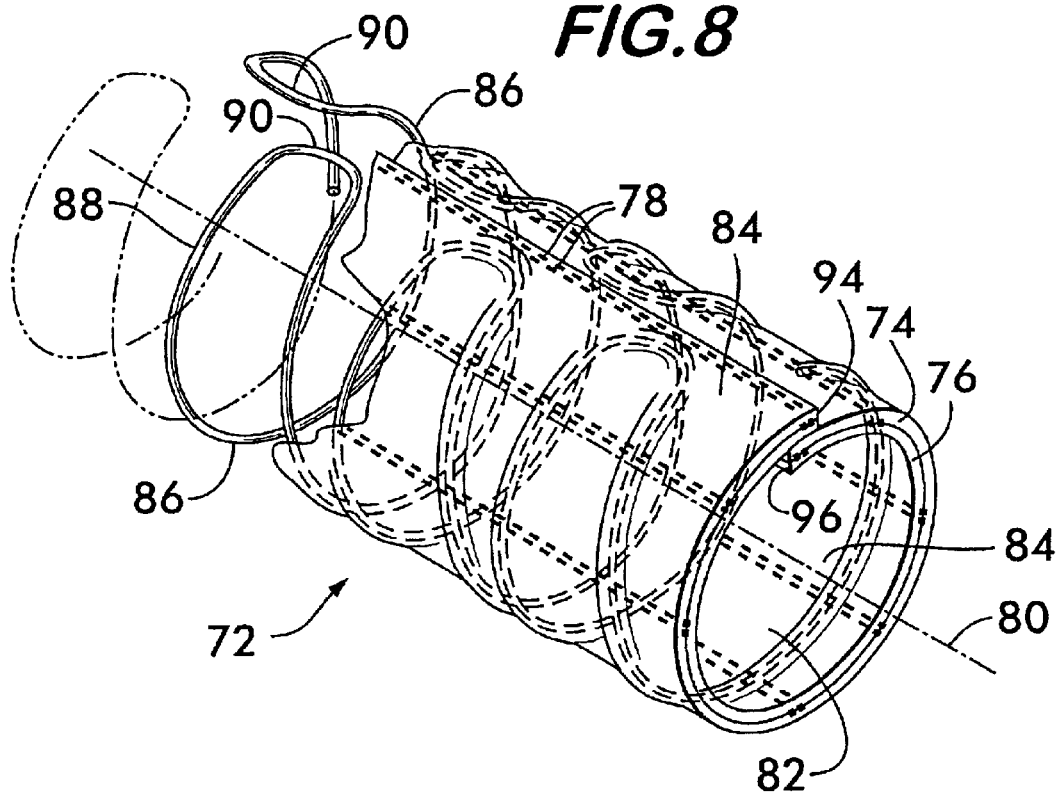
FIG. 8 is a partial cut-away perspective view of yet another embodiment of a damped sleeve according to the invention.
Figure 9:
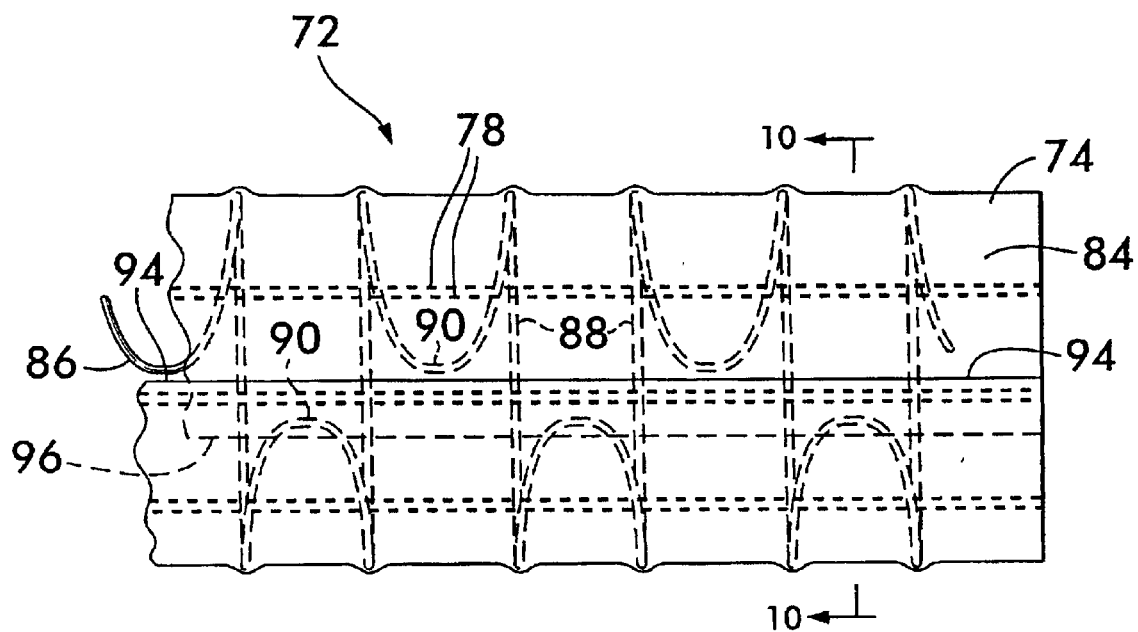
FIG. 9 is a side view of the sleeve shown in FIG. 8.

Yet another embodiment of a sleeve 72 according to the invention is shown in FIGS. 8 and 9. Similar to the previous embodiments, sleeve 72 comprises a damping layer 74 of an energy absorbing material attached to a backing layer 76 by a plurality of lines of attachment 78. The layers are positioned coaxially around an axis 80 and spaced outwardly from the axis to define a central space 82 adapted to receive elongated substrates. The lines of attachment 78 are oriented lengthwise along the sleeve 72 and define a plurality of pockets 84 between the damping and backing layers 74 and 76, the pockets conforming to an elongated shape substantially parallel to the axis 80.

Figure 10:
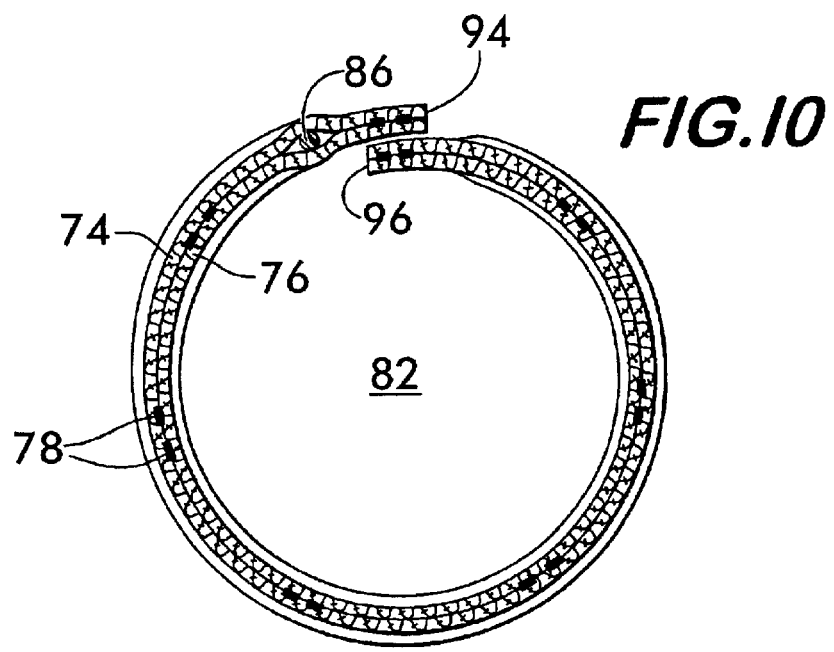
FIG. 10 is a cross-sectional view taken along lines 10—10 of FIG. 9.
Figure 11:
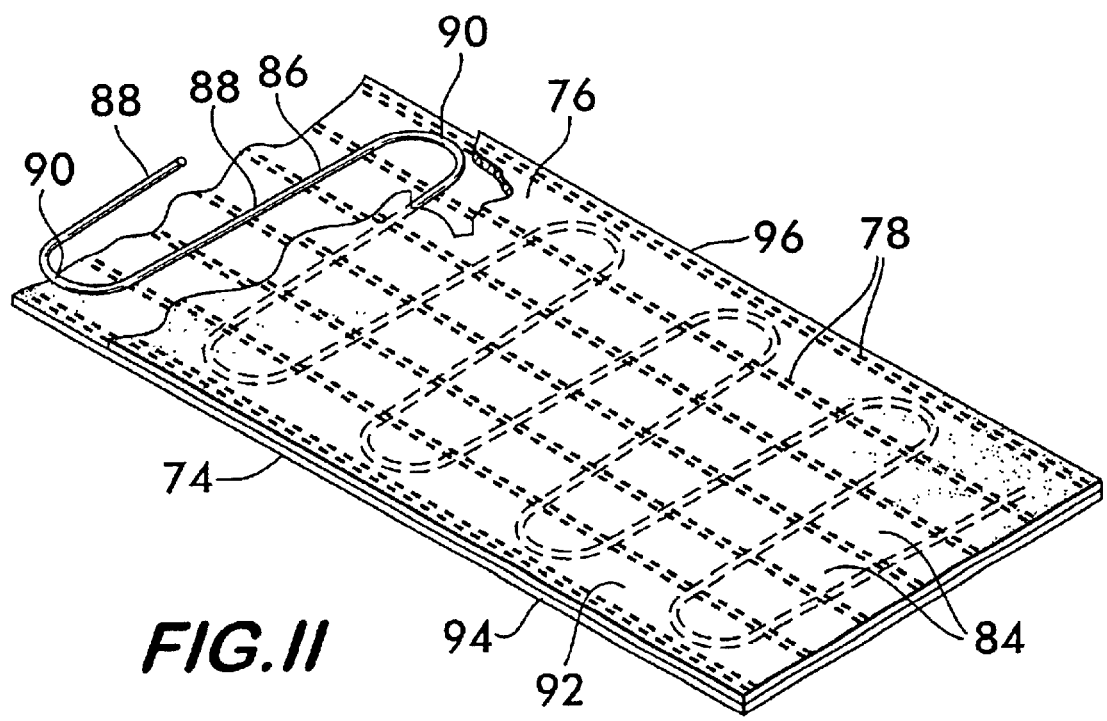
FIG. 11 is a perspective view of the sleeve shown in FIG. 8 in a flat configuration.

The damping layer 74 and support layer 76 of sleeve 72 are radially supported in spaced relation to the axis 80 by a resilient filamentary support member 86. As in the previous embodiments, support member 86 is formed from a polymeric material, preferably a thermoplastic, which can be resiliently set into a shape to bias the layers into a desired configuration. As best shown in FIG. 11, which depicts sleeve 72 laid out flat, support member 86 is resiliently set into a zig-zag shape comprising a plurality of segments 88 each connected to one another by a plurality of reverse bends 90. The support member 86 is positioned between the damping and backing layers 74 and 76, which, in the flat configuration take the form of an elongated strip 92 having oppositely disposed edges 94 and 96. The lines of attachment 78 are oriented lengthwise along the strip, and segments 88 are oriented transversely, and preferably substantially perpendicularly, to the lines of attachment with the reverse bends 90 being positioned adjacent to opposite edges 94 and 96. The lines of attachment 78 cross or intersect the segments 88 and fix their position between the damping and backing layers 74 and 76. The sleeve 72 is formed from strip 92 by resiliently curving segments 88 around axis 80 to bring the opposite edges 94 and 96 adjacent to one another, for example, in overlapping engagement as shown in FIG. 10, thereby defining the central space 82 adapted to receive elongated substrates.

Damped sleeves according to the invention provide a flexible, resilient and cost effective means for protecting elongated substrates subjected to harsh vibrational environments and will eliminate annoying rattle noise, as well as extend the fatigue life of substrates ensheathed within damped sleeves according to the invention.

What is claimed is:

1. A damped sleeve for receiving and protecting elongated substrates, said sleeve comprising:
    a flexible damping layer positioned coaxially around an axis and radially spaced outwardly therefrom, thereby defining a central space for receiving said elongated substrates, said damping layer being a first elongated strip helically wound around said axis at a predetermined pitch and formed from an energy absorbing material;
    a flexible backing layer positioned in facing relationship with said damping layer, said backing layer being a second elongated strip helically wound around said axis at said predetermined pitch, said backing layer and said damping layer being attached to one another along a plurality of lines of attachment oriented lengthwise along said first and second strips and positioned in spaced relation to one another; and
    a resilient, flexible, elongated filamentary support member positioned between said damping and said backing layers and fixed in position by said lines of attachment, said filamentary support member being captured between two of said lines of attachment and resiliently set into a helical shape substantially conforming to said predetermined pitch so as to support said damping and backing layers in said spaced relation to said axis, thereby maintaining patency of said central space.

2. A damped sleeve according to claim 1, wherein said damping layer comprises a non-woven felt.

3. A damped sleeve according to claim 2, wherein said backing layer comprises a non-woven felt.

4. A damped sleeve according to claim 3, wherein said damping layer and said backing layer comprise a polymeric material.

5. A damped sleeve according to claim 4, wherein said polymeric material is selected from the group consisting of polyester, polypropylene and nylon.

6. A damped sleeve according to claim 1, wherein said filamentary support member comprises a polymeric monofilament.

7. A damped sleeve according to claim 6, wherein said monofilament is formed from a material selected from the group consisting of nylon, polypropylene, ABS and polyester.

8. A damped sleeve according to claim 3, wherein said damping layer and said backing layer comprise the same material.

9. A damped sleeve according to claim 8, wherein said backing layer and said damping layer are attached by fusing said layers to one another along said lines of attachment.

10. A damped sleeve according to claim 9, wherein said layers are fused by a plurality of welds spaced intermittently along said lines of attachment.

11. A damped sleeve according to claim 1, further comprising an elongated substrate received within said central space.

12. A damped sleeve according to claim 11, wherein said elongated substrate comprises a wiring harness.

13. A damped sleeve according to claim 1, wherein said strips have a predetermined width with oppositely arranged edges in substantially parallel, spaced relation, said pitch being determined relatively to said width so as to position said edges in abutting relationship, thereby forming a substantially continuous tube.

14. A damped sleeve according to claim 1, wherein said strips have a predetermined width with oppositely arranged edges in substantially parallel, spaced relation, said pitch being determined relatively to said width so as to position said edges in overlapping relationship, thereby forming a substantially continuous tube.

15. A damped sleeve according to claim 1, wherein said strips have a predetermined width with oppositely arranged edges in substantially parallel, spaced relation, said pitch being determined relatively to said width so as to position said edges in spaced relationship, thereby forming a substantially discontinuous tube.

16. A damped sleeve for receiving and protecting elongated substrates, said sleeve comprising:

a flexible damping layer positioned coaxially around an axis and radially spaced outwardly therefrom, thereby defining a central space for receiving said elongated substrates, said damping layer being formed from an energy absorbing material;

a flexible backing layer positioned in facing relationship with said damping layer, said backing layer and said damping layer being attached to one another along a plurality of lines of attachment oriented circumferentially around said central space and positioned in spaced relation to one another lengthwise along said axis, thereby forming a plurality of circumferential pockets defined by said damping and said backing layers; and a plurality of resilient, flexible, elongated filamentary support members positioned between said damping and said backing layers, one of said filamentary members being positioned within each of said pockets and fixed in position by said lines of attachment, said filamentary support members being resiliently curved into a ring shape so as to radially support said damping and backing layers in said spaced relation to said axis, thereby maintaining patency of said central space.

17. A damped sleeve according to claim 16, wherein said filamentary support members are circular and have substantially identical radii.

18. A damped sleeve according to claim 16, wherein said damping and backing layers further comprise a pair of edges positioned adjacent to one another and oriented lengthwise along said axis, said edges defining a lengthwise slit through said damping and backing layers, each of said filamentary support members having a gap aligned with said lengthwise slit, said slit and said gaps providing access to said central space.

19. A damped sleeve according to claim 18, wherein said filamentary support members are resiliently biased so as to bring said edges into abutting relationship, thereby closing said slit.

20. A damped sleeve according to claim 18, wherein said filamentary support members are resiliently biased so as to bring said edges into overlapping relationship, thereby closing said slit.

21. A damped sleeve for receiving and protecting elongated substrates, said sleeve comprising:

a flexible damping layer positioned coaxially around an axis and radially spaced outwardly therefrom, thereby defining a central space for receiving said elongated substrates, said damping layer being formed from an energy absorbing material;

a flexible backing layer positioned in facing relationship with said damping layer, said backing layer and said damping layer being elongated strips having oppositely positioned edges, said damping layer and said backing layer being attached to one another along a plurality of lines of attachment positioned in spaced relation to one another, said lines of attachment being oriented substantially lengthwise along said strips; and a resilient, flexible, elongated filamentary support member positioned between said damping and said backing layers and fixed in position by said lines of attachment, said filamentary support member being a plurality of segments positioned in spaced relation along said strips transversely to said lines of attachment, each of said segments being connected to a neighboring segment by a reverse bend of said filamentary support member, said filamentary support member being resiliently curved about said axis so as to bring said edges adjacent to one another, thereby forming a tube defining said central space.

22. A damped sleeve according to claim 21, wherein said lines of attachment are oriented substantially parallel to said edges.

23. A damped sleeve according to claim 21, wherein said segments are substantially perpendicular to said lines of attachment.

* * * * *